Dec. 9, 1924. 1,518,294
H. C. ALLEN
TRACTOR
Filed June 6, 1921 5 Sheets-Sheet 1
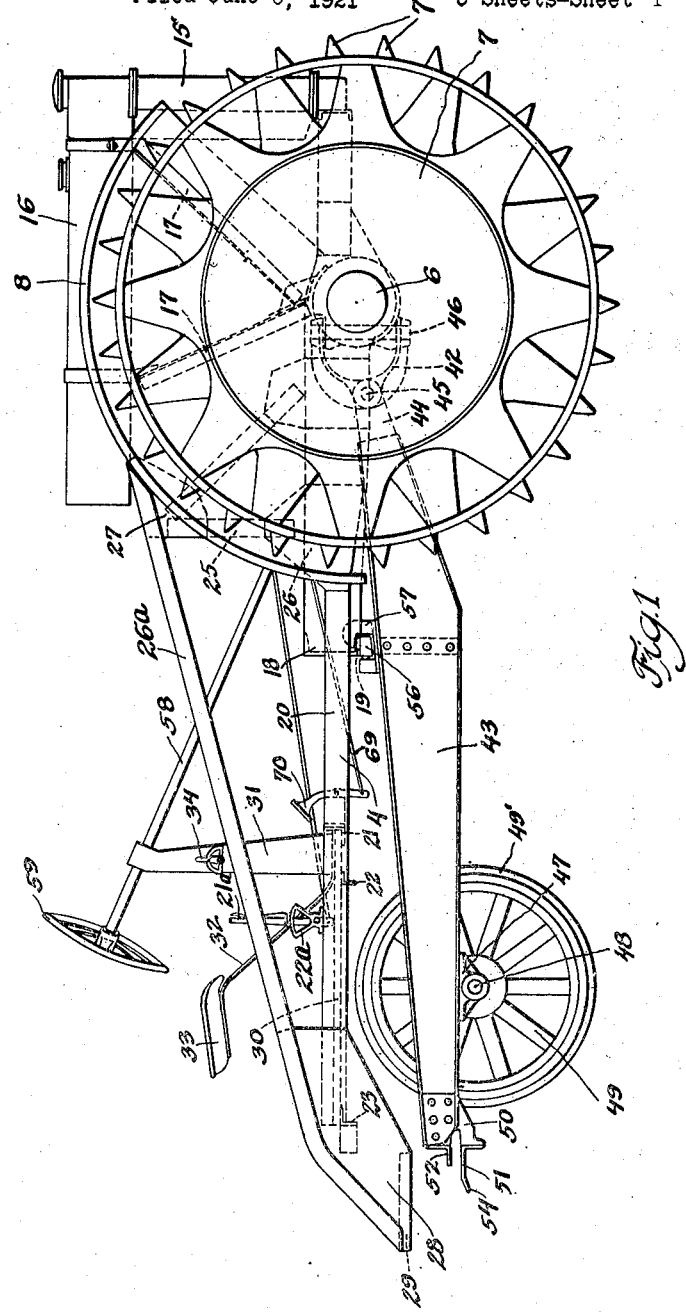
Inventor
Harry C. Allen
By his Attorneys

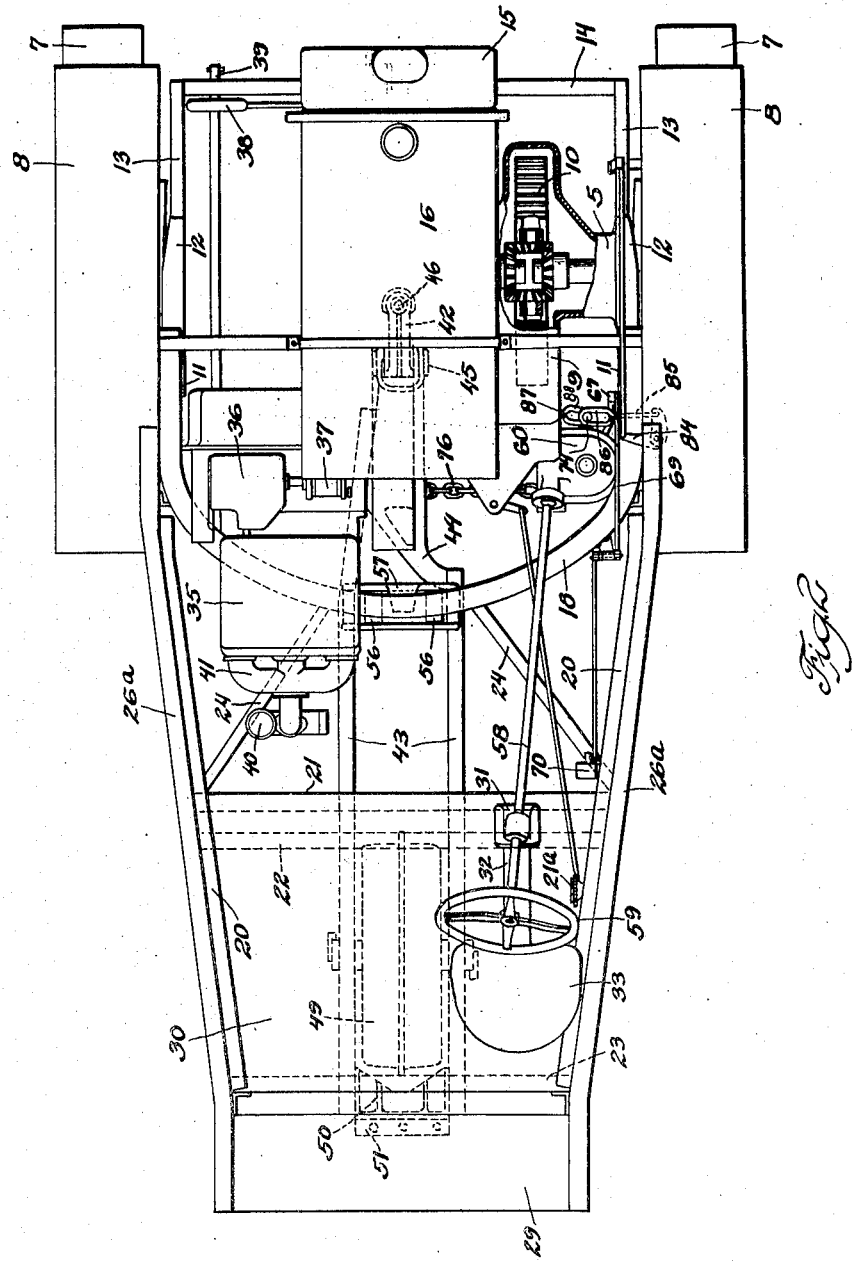

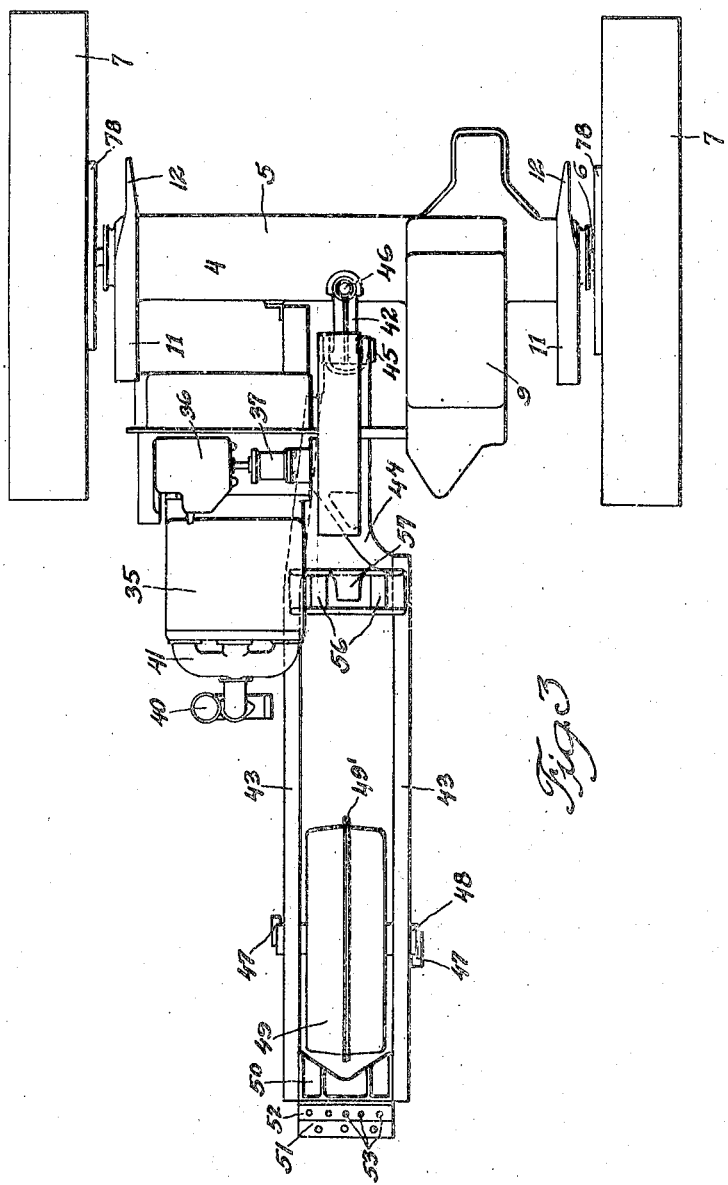

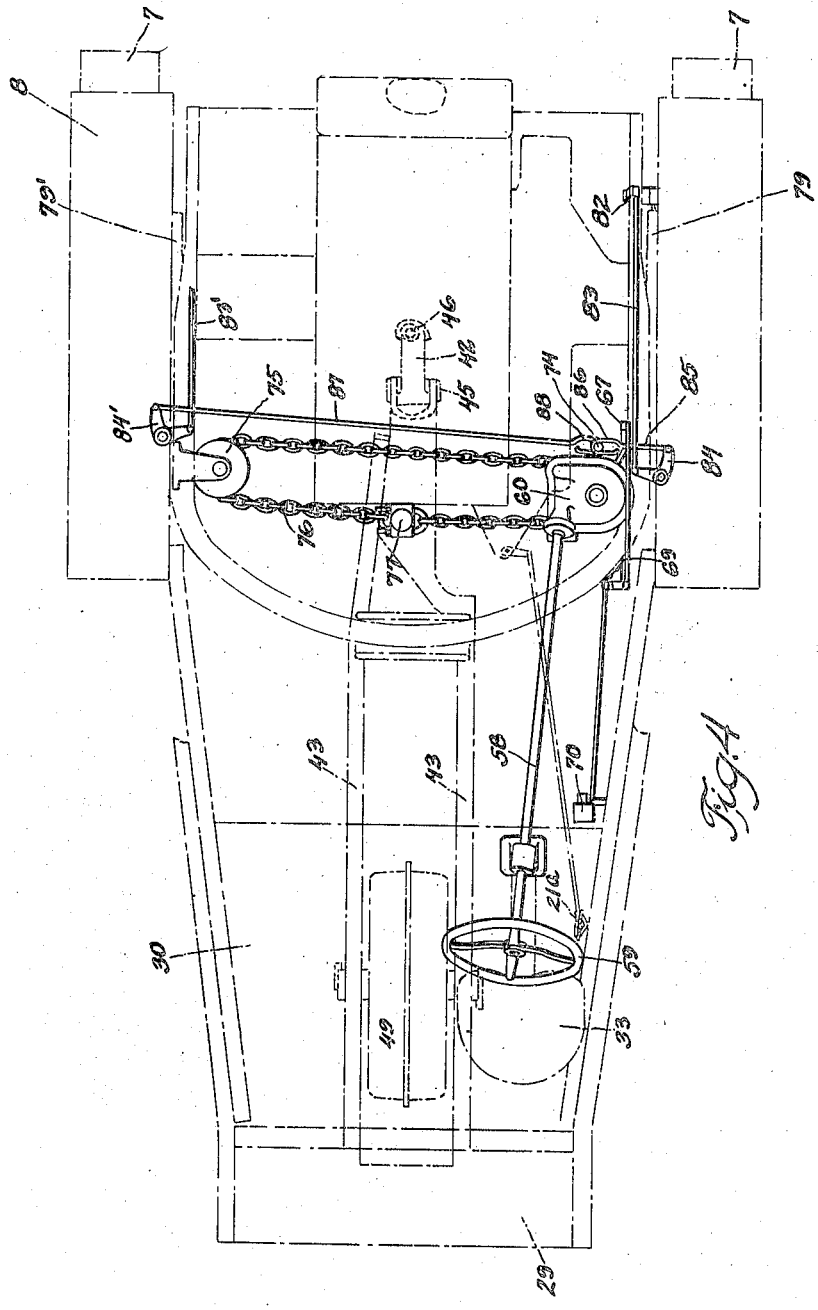

Dec. 9, 1924.
H. C. ALLEN
1,518,294
TRACTOR
Filed June 6, 1921 5 Sheets-Sheet 5
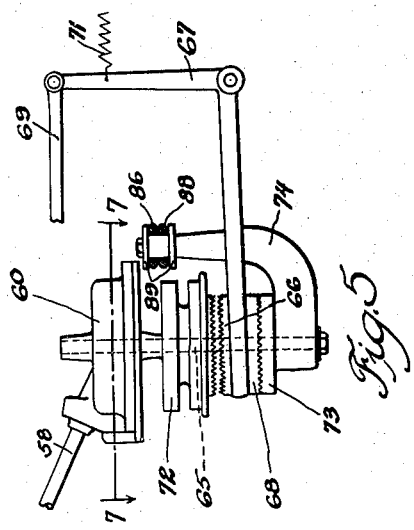
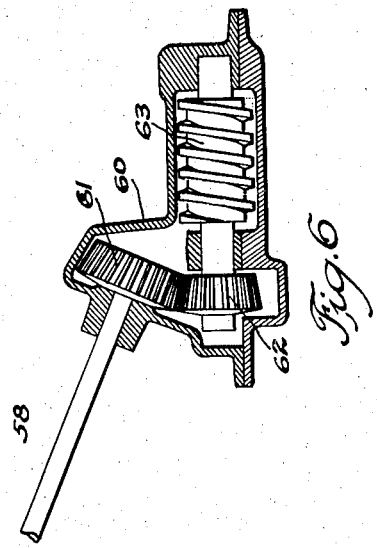
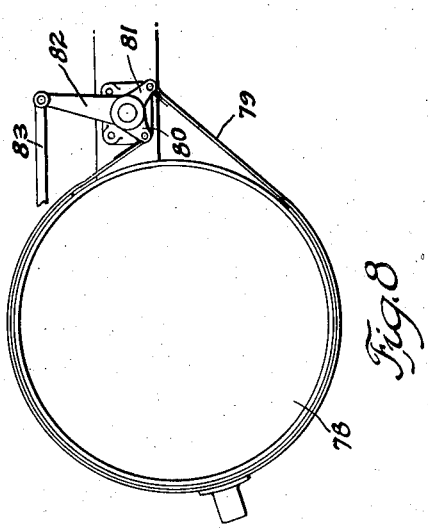
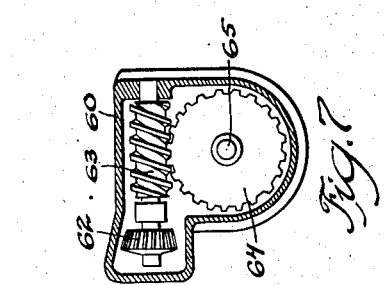
Inventor
Harry C. Allen
By his Attorneys Patented Dec. 9, 1924.

1,518,294

UNITED STATES PATENT OFFICE.

HARRY C. ALLEN, OF DETROIT, MICHIGAN.

TRACTOR.

Application filed June 6, 1921. Serial No. 475,323.

*To all whom it may concern:*

Be it known that I, HARRY C. ALLEN, a citizen of the United States, and a resident of Detroit, county of Wayne, and State of Michigan, have invented certain new and useful Improvements in Tractors, of which the following is a full, clear, concise, and exact description, such as will enable others skilled in the art to which the invention relates to make and use the same, reference being made therein to the accompanying drawings, which form a part of this specification.

This invention relates to tractors and more particularly to that type of tractors having two traction wheels associated with a trailer.

One of the objects of the invention is the provision of a dual steering mechanism whereby the device may be steered either by means of gearing or by means of braking mechanism.

Another object of the invention resides in the arrangement of the various parts and in so mounting the seat and various controls that they will remain at all times in a fixed relation to the driving wheels and in so arranging the parts that the driving torque is utilized to prevent overturning of the tractor.

A still further object of the invention is to simplify and improve the frame structure and controlling mechanism associated therewith.

With these and other objects in view, which will appear as the description proceeds, the invention consists in the novel construction and arrangement of parts, hereinafter described, particularly pointed out in the appended claims, and illustrated in the accompanying drawings, of which, Figure 1 is a side elevation of the device;

Figure 2 is a plan view thereof parts in section;

Figure 3 is a plan view with the platform and certain other parts removed;

Figure 4 is a plan view of the device parts broken away and parts removed to more clearly show certain features of the steering mechanism;

Figures 5 and 6 are detail views of the steering mechanism;

Figure 7 is a horizontal sectional view on the line 7, 7, of Figure 5; and

Figure 8 is a detail view of the braking mechanism.

The reference numeral 6 designates a driving axle on which is mounted the driving wheels 7, 7. The traction wheels 7, 7, may be provided with spuds or grousers 7' for preventing slipping or spinning of said wheels. Fenders 8, 8, supported in any suitable manner may also be provided.

A frame or platform frame 4 is secured to the axle 6 and extends forwardly and rearwardly therefrom. As shown, it consists of the housing 5 and the frame supports to be presently described. Secured to the housing 5 laterally of the center thereof, are the transmission 9 and the differential 10.

Rigidly secured to each end of the housing 5 and extending forwardly and rearwardly thereof are the frame supports 11, 11 and 12, 12. The frame members 13, 13 are secured to the supports 12, 12 and extend forwardly therefrom, and are connected at their forward ends by the transverse frame member 14 on which is mounted the radiator 15. Attached to the upper portion of the radiator 15 and extending rearwardly thereof is the fuel tank 16 which is suitably braced and supported from the sub-structure as by means of the supports or braces 17, 17.

An arcuate guide member 18 is rigidly secured to the rearwardly extending supports 11, 11. As shown, this guide 18 is provided with a flange 19 for a purpose that will presently appear. A platform support or frame is rigidly secured to the arcuate guide and extends rearwardly thereof. As shown, this support may consist of frame members 20, 20 which are rigidly secured to the guide 18 and extend rearwardly therefrom. Cross bars 21, 22 and 23 are provided for tying the frame members 20, 20 together. A brace member 24 between the guide 18 and the frame members 20, 20 may be provided. The platform support may also have the vertical members 25 secured thereto as by means of the gusset plates 26, to the upper ends of which downwardly and rearwardly extending brace members 26ᵃ may be secured as by means of guesset plates 27. The rear ends of the brace members 26ᵃ are secured to the rear end of the platform frame as by means of gusset plates 28, and may be bent downwardly to support a step 29.

A platform 30 is secured to the rear ends of the supports 20, 20 and extends forwardly to the cross pieces 21 and 22. The steering post support 31 and the spring 32 of the seat 33 are adapted to be secured above the platform 30 to the cross bars 21 and 22. A gear shift lever 21ª with its locking segment 22ª is mounted on the platform adjacent the seat. A suitable control lever arrangement 34 is placed within convenient reach of the operator as by mounting it on the steering post support 31, as shown.

An engine 35 preferably of the two cylinder type having the carbureter 40 and manifold 41 is mounted on the tractor preferably by suitable brackets on the guide and frame and at one side of the longitudinal center of the tractor with its crank shaft extending transversely to said frame. A governor 36, magneto 37 and the pump 38 for the cooling fluid are mounted on the engine side of the tractor and are operated by the motor by suitable mechanism. The pump shaft 39 is extended beyond the forward end of the frame and is provided with means for the engagement of a crank for starting the engine.

It will be noted that the engine is arranged on one side of the longitudinal center of the tractor and is balanced by arranging the seat, transmission and differential on the other side. The result is each traction wheel carries substantially the same load and hence the steering of the device is not affected by this arrangement.

It will also be noted that the seat is arranged considerably rearwardly of the axle. This arrangement provides a weight which more than counteracts the driving torque when the tractor is driven rearwardly.

The tractor is provided with a second or sub-frame. This sub-frame may be in the form of a trailer which may be said to perform the function of a rudder, a hitch or draw-bar, and a support for the rear portion of the platform frame. The trailer comprises two spaced bars 43, 43 which are rigidly connected at their forward ends to a common connecting bar 44 which in turn is pivoted to the rear portion of a stirrup 42 by the horizontal pivot 45. The stirrup 42 is pivoted to a vertical bearing 46 carried by the rear portion of the housing 5. Rigidly attached adjacent to the rear ends of the bars 43, 43 are bearings 47, 47 in which is journaled the axle 48 of the trailer wheel 49. This wheel may be provided with ground engaging devices of any suitable form, such as the flange 49'. The rear ends of the bars 43, 43 are rigidly connected together by means of the hitch member 50 which includes the lower lip extension 51 and the spaced upper lip extension 52 having the aligned openings 53 therethrough to receive a pin for adjustably securing a load thereto. The lower lip extension extends rearwardly beyond the upper lip extension and has its extreme outer end 54 bent downwardly to facilitate the attachment of implements thereto.

The trailer is provided with rollers 56, 56, on which the arcuate guide 18 is adapted to bear. A finger 57 is adapted to engage the upper surface of the flange 19 to prevent undue separation of the frame and trailer.

It will also be appreciated that the arrangement of the device is such that there is sufficient weight rearwardly of the driving axle to counteract the driving torque when the tractor is driven rearwardly. Moreover, by arranging the two driving wheels in front, the driving torque is utilized in straight ahead driving to hold the rear wheel firmly against the ground in order that it may act as an efficient rudder in steering the tractor.

In steering the device for straight ahead driving it is desirable to swing the axle, and any suitable means may be provided for accomplishing this function. As shown, a manually operated member, as a steering rod 58, is journaled in the upper end of the support 31. The upper end of this steering rod is provided with a steering wheel and its lower end extending into a casing 60 (see Figures 4, 5, 6) is provided with a gear 61 that meshes with the pinion 62 mounted on a shaft on which is secured the worm 63. The worm 63 is in engagement with the worm gear 64 fixed on the upper end of the shaft 65. A double clutch member 66 is mounted on the shaft 65 to turn therewith. The clutch member is movable along the shaft 65 by means of a bell crank lever 67 one end of which is secured to a collar 68 within which the clutch member rotates and its other end is secured to a rod 69 which is operated by the foot pedal 70 against the tension of the spring 71. When the clutch member is moved upwardly it is adapted to clutch the chain pulley 72 to cause said pulley to turn with the clutch and shaft 65. When it is moved downwardly it clutches with the clutch member 73 rotatably mounted on the shaft 65 the member 73 carries an arm 74 rigidly connected thereto.

Mounted on the opposite side of the tractor from the pulley and in the same plane therewith, is an idler pulley 75. A chain 76 is trained about the two pulleys 72 and 75 and has its ends attached to a bracket 77 carried by the frame member 44 of the trailer. It will thus be seen that when the clutch members 66 and 72 are in engagement and the steering wheel 59 is given a right hand turn, i. e. turned clockwise the chain will tend to move the bracket 77 to the left and consequently the trailer to the left but since the trailer wheel is not a castor the trailer does not move laterally and consequently the traction wheels turn to the right about the vertical pivot 46. Likewise, a left-hand turn of the steering wheel will turn the tractor to the left, as is usual in devices employing steering wheels.

The above described steering mechanism is especially useful in straight ahead driving but when the device on which it is employed is to be turned particularly in making short turns the steering wheel must be turned considerably in order to accomplish an abrupt turning of the tractor. Under short turning conditions it is desirable to steer by driving, and I have provided means operable from the steering wheel for accomplishing this result.

This may be accomplished in any suitable manner. As shown in Figure 8, a brake drum 78 is secured to the inner side of each traction wheel in any convenient manner. The brake bands 79, 79' are adapted to engage the drums. Since the bands and drums at the two sides of the tractor are both alike only one need be described. A brake drum 78 has a brake band 79 extending about its periphery and has its ends secured to two projections 80 and 81 on the lever 82. An operating rod 83 extends rearwardly and is pivotally connected to one arm of the bell crank lever 84. A rod 85 is pivoted to the other arm of the bell crank lever and has its free end provided with a loop 86 for engaging the upper end of the standard 74 between the flanges 89. One end of the corresponding bell crank lever 84' on the other side of the tractor (see Figure 4) has a similar connecting rod 83' for operating the band brake 79'. A connecting rod 87 is connected to the other end of the bell crank lever 84' and has its free end also provided with a loop 88 which also engages the arm 74 between the flanges 89. The loops are so arranged that when the arm 74 is moved toward the left in Figure 4 the brake band 79 will be operated to grip the corresponding drum, the loop 88 permitting the movement of the arm 74 without affecting the band 79'. Likewise, the brake at the left of the tractor may be applied without affecting the brake at the right side.

The operation of the steering mechanism is as follows:—When it is desired to steer by swinging the axle of the tractor, the clutch 66 is permitted to engage the pulley 72 and then the tractor may be steered by turning the steering wheel 59 which movement is communicated to the pulley 72 through the gears 61, 62, 63 and 64 to operate the chain 76 to swing the axle to make the desired turn. If, however, it is desired to make an abrupt or short turn as when turning the tractor at the end of the land or field, the foot pedal 70 is operated to move the clutch out of engagement with the pulley 72 and into engagement with the clutch member 73. Then by giving the steering wheel a turn, for instance a right hand turn, the arm 74 will be moved to the left thus applying the brake to the right hand wheel and thereby causing the tractor to turn to the right. It will be appreciated that a slight turn of the steering wheel will be sufficient to turn the tractor. When the turning has been accomplished the operator may release the pedal and the spring 71 will automatically move the clutch member 66 in engagement with the pulley 72 whereby the tractor may be steered by the steering wheel through the chain arrangement as described above.

It will thus be seen from the foregoing that the tractor may be steered by means of the steering wheel independently of the driving mechanism or it may be steered by means of the steering wheel in connection with the driving mechanism and that the shift from one to the other is readily and easily made.

While one embodiment of the present invention has been specifically illustrated and described, it is to be understood that the present invention is not limited thereto except as required by the language of the claims when interpreted in view of the prior art.

I claim:—

1. In a tractor, a frame; two traction wheels associated with said frame; driving mechanism through which said wheels are driven differentially, so that each may rotate slower than the other; steering mechanism independent of said driving mechanism whereby the tractor may be steered; two brake members associated one with each of said traction wheels; means for interrupting the operation of said steering mechanism; and means for connecting said steering mechanism with said brake members so that either may be applied independent of the other to the traction wheel with which it is associated.

2. In a tractor, a frame; traction wheels associated with said frame; two driving axles through which said traction wheels are driven; differential mechanism intermediate the inner ends of said driving axles and through which either, and the traction wheel associated therewith, may be driven independently of the other; driving mechanism acting through said differential mechanism to drive said traction wheels; two brake members associated one with each of said traction wheels; steering mechanism independent of said driving mechanism for steering the tractor; means for interrupting the operation of said steering mechanism; and means for applying either one of said brake devices to the exclusion of the other, to thereby retard the speed at which one or the other of said traction wheels is driven.

3. In a tractor, a frame; two traction wheels associated with said frame; two shafts arranged in alignment and to the outer ends of which said traction wheels are secured; differential driving mechanism intermediate the inner ends of said shafts and through which the same may be driven; steering mechanism independent of said driving mechanism for steering the tractor; means for interrupting the operation of said steering mechanism aforesaid; and means whereby and through which either one of said brake members may be operated independently of the other from said steering mechanism, to thereby retard the speed at which each traction wheel is driven relative to the other.

4. In a tractor, a main frame, means for propelling said tractor carried by said main frame; a sub-frame pivoted to the main frame, a manually operated steering member carried by said main frame, two sets of steering means for turning said tractor, one of said sets having means connected to both of said frames for moving one of said frames relative to the other and means for connecting and disconnecting either of said sets with said steering member, substantially as shown and described.

5. In a tractor, a main frame, a traction member at each side of said frame and at the front end thereof, differential mechanism between said members, propelling mechanism for said members, a rotatable steering member carried by said frame, a sub-frame pivoted adjacent to the front end of said main frame for supporting the rear end of said main frame, and means associated with said steering member and said propelling mechanism for turning said tractor, substantially as shown and described.

6. In a motor propelled device, a main frame, propelling mechanism for said device carried by said frame, a seat and steering member on said frame, a subsidiary frame pivoted to said main frame, and means for steering said device including a shaft adapted to be rotated by said steering member, a pulley loosely mounted on said shaft, a second pulley on said main frame, a flexible member trained about said pulleys and connected to said subsidiary frame, means for causing said first named pulley to rotate with said shaft, and other steering mechanism operable from said shaft when said first mentioned pulley is unconnected therewith, substantially as shown and described.

7. In a tractor, a main frame, a sub-frame pivoted to said main frame, traction wheels at the sides of said frame at the forward end thereof, propelling mechanism for said wheels, brakes for said wheels, a steering member, a shaft rotated by said member, a pulley loosely mounted on said shaft, a second pulley mounted on said main frame, a flexible member trained about said pulleys and having its ends attached to said sub-frame, an arm loosely mounted on said shaft, means including slotted members engaging said arms for severally operating said brakes, a clutch member slidably mounted on said rod to rotate therewith and means for shifting said clutch to engage said pulley or said arm to cause the same to turn with said rod to turn said tractor, substantially as shown and described.

8. In a tractor, a main frame including a housing, an arcuate member having a horizontal flange and rearwardly extending frame supports, an axle in said housing, traction wheels on said axle, a seat and controls mounted on said rearwardly extending supports, a draw-bar trailer pivoted to said axle housing at the rear side thereof, and bearing means on said trailer for engaging on the upper and lower surfaces of said flange and means for swinging said main frame relative to said trailer substantially as shown and described.

9. In a device of the class described, a front axle housing, front and rear frame supports secured to said housing, a brace member secured to the rear end of said rear frame support, and extending diagonally upwardly therefrom and fixedly secured at its front end relative to said axle housing, said brace having its rear end bent downwardly, and a step secured to said end, substantially as shown and described.

10. In a tractor, a frame, an axle secured to said frame intermediate the ends thereof, a motor mounted on said frame rearwardly of said axle, a cooling fluid pump on said frame forwardly of said axle, and a shaft for operating said pump from said motor, said shaft extending forwardly beyond said frame and being provided with means for the attachment of a starting crank, substantially as shown and described.

In testimony whereof I affix my signature.

HARRY C. ALLEN.